(No Model.)
C. FASOLDT.
MICROSCOPE.
No. 334,009. Patented Jan. 12, 1886.
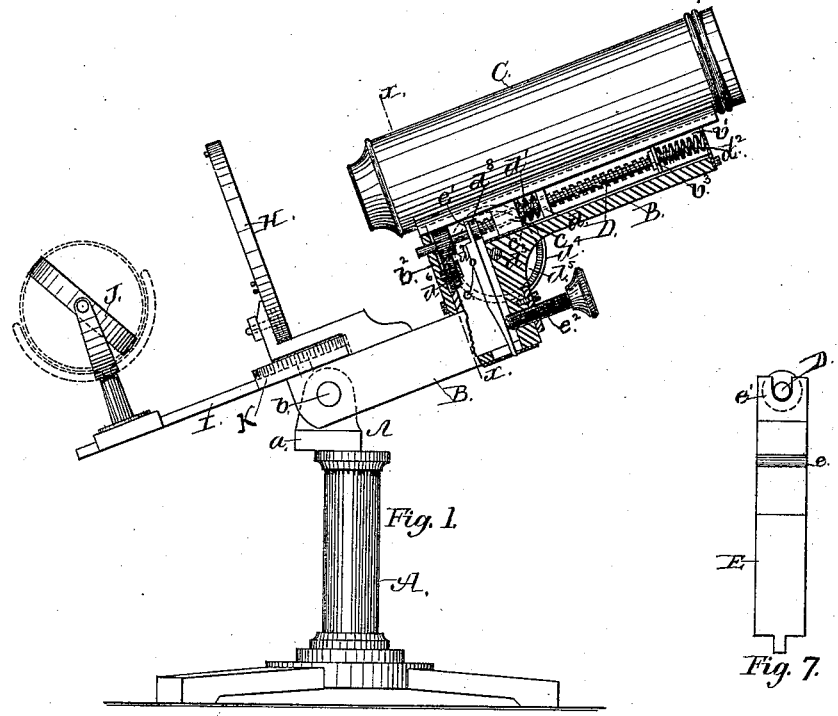
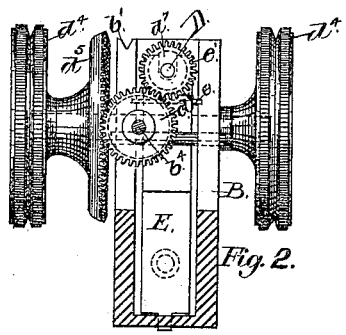
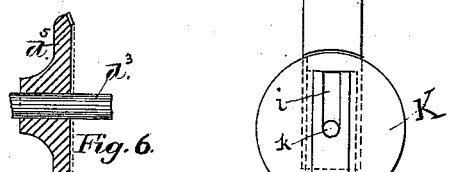
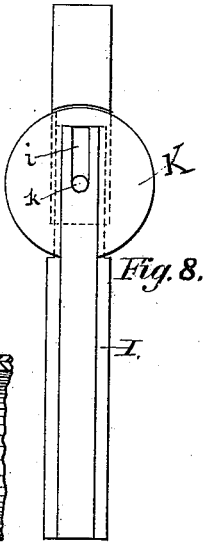
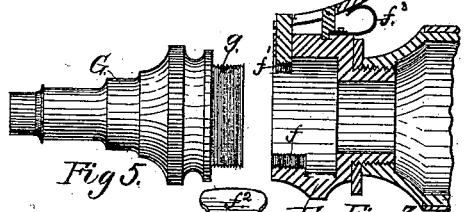
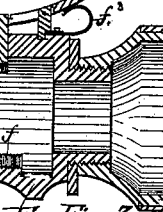
Witnesses:
S. B. Brewer.
Inventor
CHARLES FASOLDT,
by William N. Low
Attorney.
N. PETERS, Photo-Lithographer, Washington, D. C.

UNITED STATES PATENT OFFICE.

CHARLES FASOLDT, OF ALBANY, NEW YORK.

MICROSCOPE.

SPECIFICATION forming part of Letters Patent No. 334,009, dated January 12, 1886.

Application filed May 5, 1884. Serial No. 130,370. (No model.)

*To all whom it may concern:*

Be it known that I, CHARLES FASOLDT, of the city and county of Albany, in the State of New York, have invented certain new and useful Improvements in Microscopes, of which the following is a specification.

My invention relates to improvements in the construction of the external parts of microscopes; and the objects of my improvements are, first, to afford means for effecting and retaining an accurate adjustment of the tube in respect to the stage of the instrument; second, to afford facilities for rapidly effecting an exchange of objectives; and, third, to provide a detachable arm for the reflector, so that the instrument can be packed away in a smaller space. These objects I attain by means of the mechanism illustrated in the accompany drawings, which are herein referred to, and form part of this specification, and in which—

Figure 1 is a side elevation of a microscope containing my improvements, with portions of the supporting-frame removed for the purpose of showing underlying parts; Fig. 2, an enlarged transverse section of the supporting-frame at the line $x\ x$ on Fig. 1; Fig. 3, a longitudinal section of part of the tube with my improved nose-piece; Fig. 4, a front elevation of the nose-piece; Fig. 5, a side elevation of an objective; Fig. 6, a horizontal section of the wheel and pinion for operating the tube-adjustment; Fig. 7, a front elevation of the lever for the fine adjustment; and Fig. 8 an inverted plan view of the detachable arm for the reflector.

As illustrated in the drawings, A is the standard for the instrument; B, the supporting-frame; C, the tube; D, the principal adjusting-screw; E, the lever for the fine adjustment; F, the nose-piece; G, the objective; H, the stage; I, the detachable arm for the reflector; and J the reflector.

The standard A is made in the usual form, with a central vertical pivot, of which the head $a$ is an integral part.

The supporting-frame B is hinged, as at $b$, to the head $a$ of the standard, and is provided with a stage, H, of any suitable construction, which is arranged at right angles to the center line of the tube of the instrument.

The tube C is fitted to slide on guides formed on part $b'$ of the supporting-frame. Said tube has on its under side a stationary nut, $c$, which may be either fixed or formed thereon. Said nut has projecting flanges which engage in suitable grooves in the supporting-frame, so as to prevent the tube C from being displaced from its position on the supporting-frame.

The adjusting-screw D is arranged parallel to the center line of the tube C, in a chamber formed in the part $b'$ of the supporting-frame. Said screw is adapted to engage in the nut $c$ on the under side of the tube C, for the purpose of effecting the adjustment of said tube in respect to the stage H. A separate nut, $d$, which is not attached to the tube C and is not revoluble, is fitted upon the screw D so as to remain at a short distance from the nut $c$, and a spring, $d'$, is interposed between the nuts $c$ and $d$, for the purpose of taking up any lost motion that may occur by reason of the wearing away of the threads on the screw D or in the nut $c$. One end of the screw D is journaled in the plate $b^2$ of the supporting-frame, and its opposite end is journaled in a plate, $b^3$, which is fitted to slide in the chamber that contains said screw. A spring, $d^2$, bears against the plate $b^3$, and constantly presses the screw D endwise toward the plate $b^2$, for a purpose hereinafter explained. A transverse shaft, $d^3$, inserted through the supporting-frame, is provided with milled hand-wheels $d^4$ and with a bevel gear-wheel, $d^5$. The latter engages with a pinion, $d^6$, that is provided with both beveled and straight teeth, and which revolves on the stud $b^4$. The pinion $d^6$ also engages with the pinion $d^7$, which is secured to the screw D. The arrangement of the screw D and its operating mechanism is such that by turning the shafts $d^3$ by means of the wheels $d^4$, the train of gearing will cause the said screw to rotate and slide the tube C endwise responsively to the direction of the rotations of the screw, and when the rotations of the screw cease, the tube C will be retained in a fixed position, wherefrom it cannot be displaced by any endwise pressure, and in this manner I remedy a well-known defect in microscopes which have rack-and-pinion adjusting mechanisms for their tubes, in which the tubes are liable to slide down on the slightest application of pressure to their outer end, and either destroy or injure the slide that may be lying at that time on the stage H.

For the purpose of providing a fine adjustment for the tube C, a lever, E, is fulcrumed at $e$ to the supporting-frame, and has its upper (forked) end, $e'$, arranged to bear against a collar, $d^8$, on the screw D in such manner that the spring $d^2$ will keep said collar in constant contact with the lever E. A finely-threaded adjusting-screw, $e^2$, is arranged, as shown in Fig. 1, to bear against the lower end of the lever E, and by screwing in the adjusting-screw $e^2$ the lever will be tilted to force the screw D and its attached tube C endwise against the resistance of the spring $d^2$; but when the adjusting-screw $e^2$ is turned in a reversed direction the resilient action of the spring $d^2$ will force the screw D and tube C to move toward the stage H.

For the purpose of effecting a rapid exchange of objectives, a nose-piece, F, is fitted to engage in the forward end of the tube C. Said nose-piece is provided in the under side of its bore, near its outer end, with a segmental portion, $f$, of a screw-nut, and in the upper side of its bore opposite the said segmental portion a sliding piece, $f'$, is fitted to slide transversely to the bore of the nose-piece. The lower end of said sliding piece is provided with a screw-thread which corresponds to that of the segmental portion $f$, and the upper end of said sliding piece is connected to one end of the finger-lever $f^2$, which is pivoted to the upper side of the nose-piece. A spring, $f^3$, is arranged to exert its pressure against the lever $f^2$ in such manner as to force the sliding piece $f'$ downward. The objective G has on its end $g$ a screw-thread which fits into the threads cut in the segmental portion $f$ and sliding piece $f'$ of the nose-piece, and the operation of securing the said objective into the nose-piece is as follows: The sliding piece $f'$ is raised by means of the finger-lever $f^2$ sufficiently high for the screwed end $g$ to enter the bore of the nose-piece without impediment. The pressure is then removed from the lever $f^2$ and the spring $f^3$ forces said lever to tilt and move down the sliding piece $f'$ in such manner that the screwed end $g$ of the objective will engage with the threads of the segmental portion $f$ and the sliding piece $f'$, as in a nut. If, when this is accomplished, the objective and nose-piece do not form a close joint, a slight turning movement of the former will bring the two parts into close contact. The objective is removed from the nose-piece by simply raising the sliding piece $f'$ in the manner above described, and then drawing the objective endwise from the nose-piece.

The detachable arm I, for holding the reflector J, is fitted to slide into a radial dovetailed groove formed in the under side of the graduated circle K. The inner end of said arm is provided with a slotted opening, $i$, which spans the pivotal center $k$ of the graduated circle and permits said arm to extend inwardly and give to it a greater degree of stability.

I claim as my invention—

1. In a microscope, the combination, with the tube C, provided with a screw-nut, $c$, as herein described, of the adjusting-screw D, auxiliary screw-nut $d$, and spring $d'$, the said spring being interposed between the nuts $c$ and $d$, as and for the purpose herein specified.

2. In a microscope, the combination, with the tube C, adjusting-screw D, and spring $d^2$, of the lever E and adjusting-screw $e^2$, arranged to operate as and for the purpose herein specified.

3. The nose-piece F, provided with a segmental portion, $f$, of a screw-nut, and with a spring-actuated sliding piece, $f'$, having screw-threads on its lower end, as herein described, all being constructed and arranged to operate as herein specified.

4. In a microscope, the combination, with the tube C, of the nose-piece F, provided with a segmental portion, $f$, of a screw-nut, and a spring-actuated sliding piece, $f'$, having on its lower end screw-threads which supplement the threads of the segmental portion $f$, as and for the purpose herein specified.

CHARLES FASOLDT.

Witnesses:
WM. H. LOW,
S. B. BREWER.